United States Patent
Zysko

(10) Patent No.: US 6,452,510 B1
(45) Date of Patent: Sep. 17, 2002

(54) PERSONAL CABIN PRESSURE MONITOR AND WARNING SYSTEM

(75) Inventor: Jan A. Zysko, Merritt Island, FL (US)

(73) Assignee: National Aeronautics & Space Administration, Washington, DC (US)

( * ) Notice: Subject to any disclaimer, the term of this patent is extended or adjusted under 35 U.S.C. 154(b) by 0 days.

(21) Appl. No.: 09/802,535

(22) Filed: Mar. 8, 2001

Related U.S. Application Data

(60) Provisional application No. 60/214,243, filed on Jun. 14, 2000.

(51) Int. Cl.[7] .................................................. G08B 23/00
(52) U.S. Cl. ............................................. 340/970; 701/4
(58) Field of Search ................................. 340/970, 977, 340/963, 945; 701/4, 5

(56) References Cited

U.S. PATENT DOCUMENTS

| | | | |
|---|---|---|---|
| 2,728,073 A | * 12/1955 | Kelly | 340/970 |
| 4,071,894 A | * 1/1978 | Schuldt | 701/18 |
| 4,109,509 A | 8/1978 | Cramer et al. | |
| 4,319,487 A | 3/1982 | Haase et al. | |
| 4,355,294 A | 10/1982 | Ben-David et al. | |
| 4,453,154 A | 6/1984 | Rait et al. | |
| 4,602,248 A | * 7/1986 | Foster et al. | 340/601 |
| 5,022,393 A | 6/1991 | McGrady et al. | |
| 5,283,574 A | * 2/1994 | Grove | 340/970 |
| 5,372,134 A | 12/1994 | Richardson | |
| 5,522,026 A | 5/1996 | Records et al. | |
| 5,638,059 A | * 6/1997 | Pilkington | 340/970 |
| 5,666,110 A | 9/1997 | Paterson | |
| 5,691,697 A | 11/1997 | Carvalho et al. | |
| 5,781,126 A | 7/1998 | Paterson et al. | |
| 6,020,832 A | 2/2000 | Jensen | |
| 6,078,829 A | * 6/2000 | Uchida et al. | 600/310 |
| 6,266,583 B1 | * 7/2001 | Tazartes et al. | 701/4 |

* cited by examiner

Primary Examiner—John Tweel
(74) Attorney, Agent, or Firm—Gary G. Borda; John G. Mannix

(57) ABSTRACT

A cabin pressure altitude monitor and warning system provides a warning when a detected cabin pressure altitude has reached a predetermined level. The system is preferably embodied in a portable, pager-sized device that can be carried or worn by an individual. A microprocessor calculates the pressure altitude from signals generated by a calibrated pressure transducer and a temperature sensor that compensates for temperature variations in the signals generated by the pressure transducer. The microprocessor is programmed to generate a warning or alarm if a cabin pressure altitude exceeding a predetermined threshold is detected. Preferably, the microprocessor generates two different types of warning or alarm outputs, a first early warning or alert when a first pressure altitude is exceeded, and a second more serious alarm condition when either a second, higher pressure altitude is exceeded, or when the first pressure altitude has been exceeded for a predetermined period of time. Multiple types of alarm condition indicators are preferably provided, including visual, audible and tactile. The system is also preferably designed to detect gas concentrations and other ambient conditions, and thus incorporates other sensors, such as oxygen, relative humidity, carbon dioxide, carbon monoxide and ammonia sensors, to provide a more complete characterization and monitoring of the local environment.

17 Claims, 2 Drawing Sheets

PERSONAL CABIN PRESSURE MONITOR AND WARNING SYSTEM

CROSS REFERENCE TO RELATED APPLICATIONS

This application claims the benefit, under 35 U.S.C. 119(e), of U.S. Provisional Application No. 60/214,243, filed Jun. 14, 2000.

The invention described herein was made by an employee of the United States Government and may be manufactured and used by or for the Government for Government purposes without the payment of any royalties thereon or therefor.

BACKGROUND OF THE INVENTION

1. Field of the Invention

The present invention relates to a portable monitor and warning system that is employed for detecting dangerous pressure and other ambient conditions, and providing a timely warning of such conditions. Although not limited thereto, the system is particularly suited for detecting and providing a warning of a dangerous or deteriorating cabin pressure condition in an aircraft.

2. Description of the Background Art

Throughout aviation history, there have been numerous incidents where aircraft crew members and/or passengers have been incapacitated due to hypoxia resulting from the loss of cabin pressure at high altitudes or from venturing into high altitudes in unpressurized aircraft. Hypoxia is defined as an insufficient supply of oxygen to the body's tissues that insidiously affects the central nervous system and organs. The most compromising condition leading to hypoxia is not the immediately recognizable rapid decompression, but one where the cabin pressure is slowly being depleted because of a malfunctioning pressurization system or a slow, yet significant leak, has developed in the pressurized cabin or cockpit of an airplane. With crewmembers and passengers unaware, they may either simply fall asleep or be otherwise incapacitated.

The FAA has published requirements that define cabin pressure altitudes and time profiles that require the use of supplemental oxygen by the aircraft crew members and passengers. Cabin pressure altitude is the equivalent altitude above mean sea level at which the barometric pressure would equal the pressure in the aircraft cabin. According to the FAA's Airman's Information Manual, performance can seriously deteriorate within fifteen minutes at a cabin pressure altitude of 15,000 feet. The ability to take corrective and protective action is lost in 20 to 30 minutes at 18,000 feet, and in 5 to 12 minutes at 20,000 feet, which is followed soon after by unconsciousness. The FAA has thus required that supplemental oxygen be used anytime the cabin pressure altitude in civil aviation aircraft operations exceeds either 12,500 feet for 30 minutes, or 14,000 feet for any amount of time. These values for commercial aircraft operations are lower, 10,000 feet and 12,000 feet, respectively.

Though many aircraft are fitted with cabin pressurization monitoring and alerting systems, they alarm at a single altitude and do not track the 30 minute time limit in the low to high altitude corridor. Also, there are situations where the on-board system fails or is manually bypassed, thus rendering the occupants or crew totally unaware of a deteriorating or low oxygen environment. A need therefore exists for an improved monitoring system that cannot be readily bypassed, tracks time at altitude, and is not dependent on operation of other on-board systems.

SUMMARY OF THE INVENTION

The present invention addresses the foregoing concerns through provision of a cabin pressure altitude monitor and warning system that is designed to provide a warning when a detected cabin pressure altitude has reached a predetermined level. The system is preferably embodied in a portable, pager-sized device that can be carried or worn by an individual. A microprocessor calculates the pressure altitude from signals generated by a calibrated pressure transducer and a temperature sensor. The temperature sensor compensates for temperature variations in the signals generated by the pressure transducer to insure accuracy of the pressure altitude calculations.

The microprocessor is programmed to generate a warning or alarm if a cabin pressure altitude exceeding a predetermined threshold is detected. Preferably, the microprocessor executes an algorithm that generates two different types of warning or alarm outputs. A first early warning or alert when a first pressure altitude is exceeded, and a second, more serious, alarm condition when either a second, higher-pressure altitude is exceeded, or when the first pressure altitude has been exceeded for a predetermined cumulative period of time. The two altitude trigger points are based on the FAA requirements for the flight crew to use supplemental oxygen after 30 minutes of exposure to a cabin pressure altitude between 12,500 and 14,000 feet for civil aviation (between 10,000 and 12,000 feet for commercial aircraft operations), or immediately upon a cabin pressure altitude above 14,000 feet (above 12,000 feet for commercial aircraft operations). The elapsed time between the initial alert at the lower altitude trigger point, and the full alarm at the higher altitude trigger point is also considered to be an indicator of the urgency of the situation. A rather lengthy time delay of say several seconds to several minutes might indicate a relatively slowly deteriorating condition whereas an immediate transition might be indicative of a rapid decompression.

Preferably, the device provides multiple types of alarm condition indicators, including visual, audible and tactile. In the preferred embodiment, the visual output is implemented with a light emitting diode (LED) or other visual indicator that flashes when an alarm condition is triggered. A liquid crystal display (LCD) is also used to warn the user in alphanumeric text of the high cabin pressure altitude event and describe the condition of the condition influencing the alarm. It also preferably flashes a text warning to "get on oxygen now!" The audible output is preferably implemented with an electromechanical audio alarm, or the like, while the tactile output is preferably implemented with a mechanical vibrator. In addition, a speech synthesizer is incorporated to alert the user of the event, and to verbally describe the condition. It also preferably provides a corresponding verbal instruction to the text warning, e.g., "get on oxygen". This is a preferred method from a physiological standpoint, since hearing is the last sense to be impaired at the onset of hypoxia, while cognitive ability and vision are the first to be impaired. The audio warning could be readily interfaced with the pilot's headset through wired or wireless links to the aircraft's intercom, avionics system, or communication or navigation radios.

In addition to being able to monitor cabin pressure altitude, the system is also preferably designed to detect gas concentrations and other ambient conditions. The system thus incorporates other sensors such as oxygen, temperature, relative humidity, carbon dioxide, carbon monoxide and ammonia sensors, to provide a more complete characterization and monitoring of the local environment. Further, since the system microprocessor can track both time and altitude, the device can also be used for indicating the pressure altitude or the rate of climb or descent in non-pressurized aircraft.

BRIEF DESCRIPTION OF THE DRAWINGS

The features and advantages of the present invention will become apparent from the following detailed description of a preferred embodiment thereof, taken in conjunction with the accompanying drawings, in which.

DETAILED DESCRIPTION OF A PREFERRED EMBODIMENT

Figure 1:
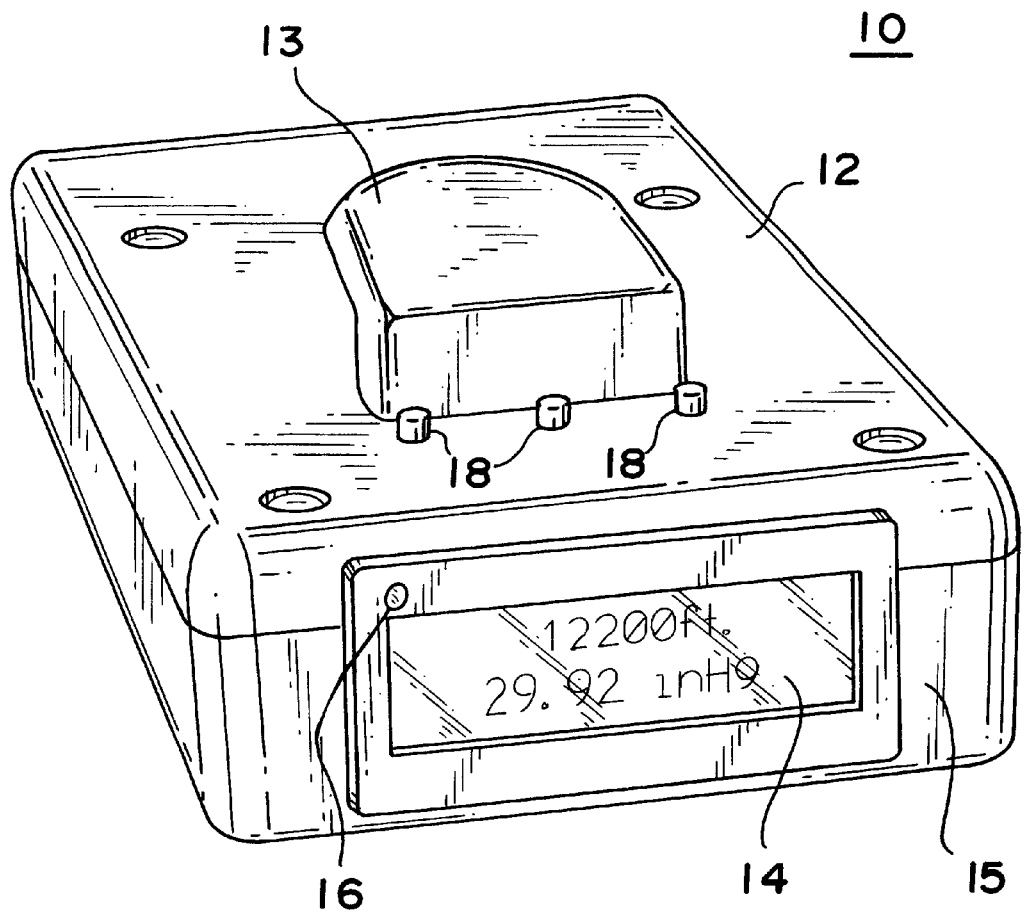
FIG. 1 is a perspective illustration of a cabin pressure altitude monitor and warning systems embodied in a portable device that is constructed in accordance with a preferred embodiment of the present invention.
Figure 2:
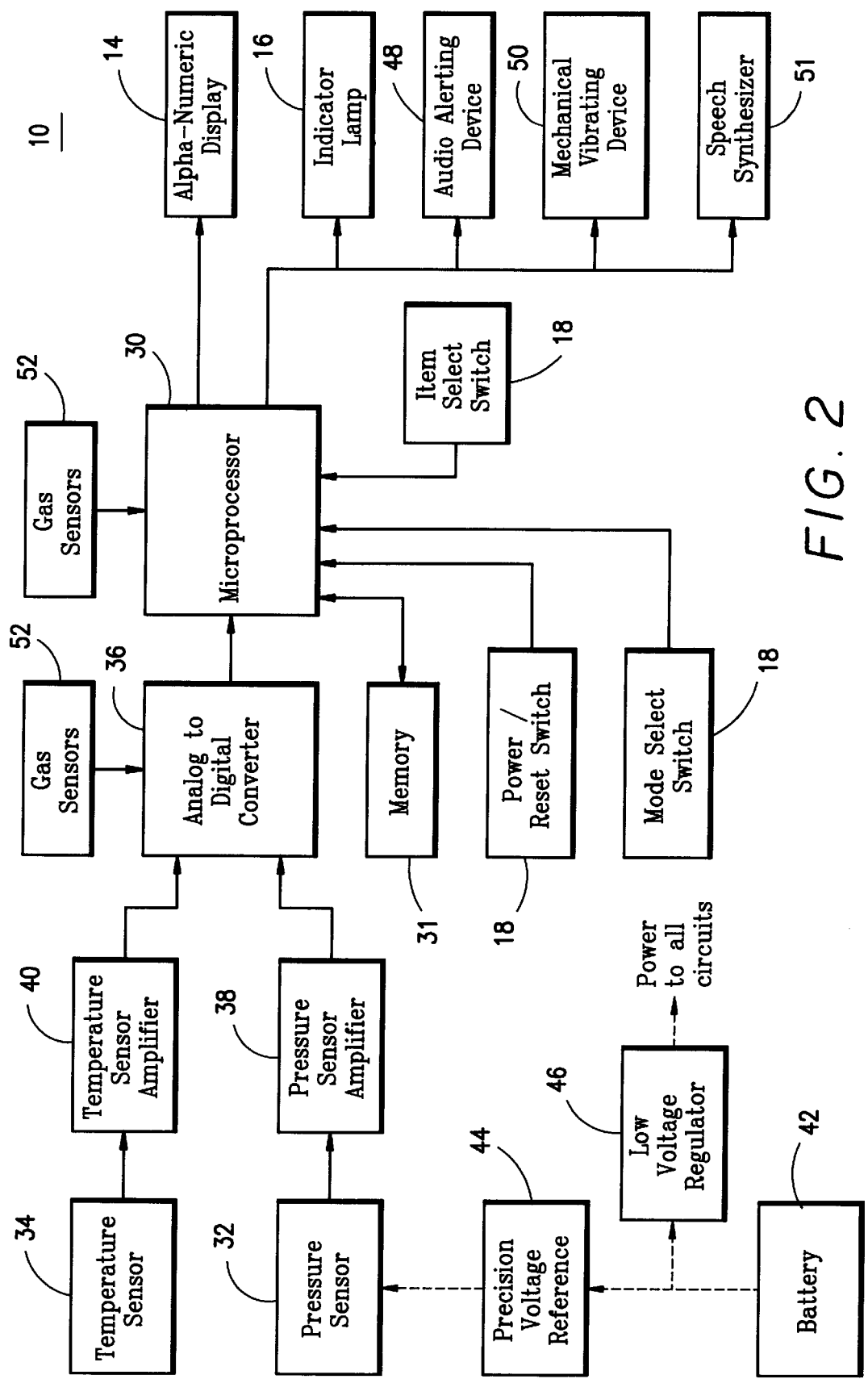
FIG. 2 is a schematic block diagram of the circuitry employed in the cabin pressure altitude monitor and warning system of FIG.1.

With reference to FIGS. 1 and 2, a portable cabin pressure altitude monitor 10 is shown that is constructed in accordance with a preferred embodiment of the present invention. The monitor 10 includes a housing 12 that contains a number of circuit components as illustrated in FIG. 2, and discussed in greater detail below. Preferably, the housing 12 is approximately the size of a personal pager device so that the monitor 10 can be worn comfortably by a user by being attached to a belt, or held in a shirt pocket, for example. A securing clip 13 is preferably provided on the housing 12 for this purpose.

A visual display 14 is disposed one end 15 of the housing 12 that comprises a digital display, e.g., LCD, for displaying numeric or alphabetic characters, or special symbols to facilitate communication with the user. The display 14 provides various information depending on a selected operational mode of the monitor 10. This information includes, for example, pressure altitude (ft., nm, km), ambient pressure (in. Hg, mb or PSI), rate of climb or descent (fpm), gas concentration of selected gases being monitored, including alarm condition (e.g., DANGER—LOW O2 LEVEL—15%, DANGER—HIGH CO LEVEL—250 PPM, WARNING—HIGH CO2 LEVEL—xxx PPM, etc.), battery condition (e.g., volts, initiated when a momentary TEST button is pressed), alarm condition (e.g., OK, Transit 12,500 ft., 14,000 ft Exceeded, 30 Minutes Exceeded, GET ON Oxygen NOW), and operational status of the monitor 10. The positioning of the display 14 on the end 15 of the housing 12 enables the display 15 to be read by an individual when the monitor 10 is disposed in their shirt pocket, for example.

An indicator lamp 16 is also disposed in the end 15 of the housing 12 that preferably comprises a low power, high intensity LED, and when blinking, is used to provide a visual warning that a pre-programmed alarm function has been activated. Thus, for example, if the monitor 10 detects the presence of a dangerous pressure or other condition, such as high CO, CO2 or NH3 concentration, for example, the indicator lamp 16 will be triggered to flash.

Also disposed on the housing 12, is a group of three switches 18, each of which is preferably a low profile membrane type switch or button. One of the switches 18 is a power/reset switch that controls the power and reset modes of the monitor 10. This is used to turn the monitor 10 on and off, to reset or change a value or function when in a menu mode, or to reset an alarm if it is sounding. The remaining two of the switches 18 are mode select and item select switches that are used by the operator to select the various operating modes, e.g., commercial or civil, to select a function or variable to update, to select items from a menu, to respond YES or NO to queries, or to increment or decrement a counter or value. The switches are also used to adjust the altitude or local barometric pressure to account for changes in atmospheric pressure. The unit will also display altitude above a zero reference level [above ground level (AGL) in non-pressurized aircraft] if the switches are pressed in combination. Normally, the device would display equivalent pressure altitude or altitude above mean sea level (MSL) in a non-pressurized aircraft.

As illustrated in the block diagram of FIG. 2, the heart of the monitor 10 is a microprocessor 30 that receives inputs from a pressure sensor 32 and a temperature sensor 34 through a high-resolution analog to digital (A/D) converter 36. The microprocessor 30 is preferably a small micro-chip, computer based processor, which takes the various signal, and operator inputs and controls the timing, digital display and alarms to provide information to the user. The microprocessor 30 also sets up the various operating modes and provides monitoring of the battery condition and general health of the monitor 10. A memory 31 is interfaced to the microprocessor 30 for storing various variables and measurements, as is conventional.

The pressure sensor 32 is preferably a small, absolute pressure transducer, and is employed to sense the ambient (e.g., local cabin) pressure. The temperature sensor 34 is preferably a small, temperature transducer that is employed to sense the local temperature in the vicinity of the pressure transducer for real time temperature compensation of the pressure measurement. This function is important to insure that the microprocessor 30 can accurately calculate the pressure altitude form the signals generated by the pressure sensor 32. An accuracy of at least 1.0% is desired, but 0.1% is preferred.

The signals generated by the two sensors 32 and 34 are conditioned by a pressure sensor amplifier 38 and a temperature sensor amplifier 40, respectively, prior to being fed into the A/D converter 36. The two amplifiers 38 and 40 are provided to condition, filter and boost the output levels of the sensors 32 and 34 to levels that are acceptable to the A/D converter 36.

A battery power supply 42 (e.g., 9 volt, or multiple AA or AAA cells) serves as the primary power source for the monitor 10, and supplies the power to the pressure sensor 32 through a precision voltage reference 44, and to all other circuits in the monitor 10 through a low voltage regulator 46. With proper selection of the monitors circuit components and devices, the energy demand of the monitor 10 is minimal.

In addition to supplying output signals to the display and the indicator lamp 16, the microprocessor 30 also supplies output signals to an audio alerting device 48, a mechanical vibrating device 50 and a speech synthesizer device 51. The audio alerting device 48 is preferably an electro-mechanical audio alarm that provides an audio warning that a pre-programmed alarm function has been activated. Similarly, the vibrating device 50 provides a physical vibration warning that a pre-programmed alarm function has been activated. The speech synthesizer 51 includes the necessary audio circuitry and speaker to convert text from the microprocessor 30 to spoken words. A typical phrase to be spoken is "get on oxygen" which would be generated after a second level alarm condition has been detected. As discussed previously, the audio alerting device 48 and the speech synthesizer 51 are important features of the invention since hearing is the last sense to be impaired at the onset of hypoxia, while cognitive ability and vision are the first to be impaired.

The permissible human exposure level to various gases may vary with local barometric pressure (altitude), temperature, relative humidity, a persons physical condition or overall health, and other factors including exertion level, blood chemistry, etc. A hazardous threshold level (or limit) at the sea level may be significantly reduced as altitude is increased.

Hypoxic hypoxia is any condition that interrupts with the flow of oxygen into the lungs. In aviation and aerospace, this is most often caused by the reduced partial pressure of oxygen due to increased (cabin) altitude (or lower atmospheric pressure). The onset and the severity of hypoxic hypoxia are negatively influenced by the rapidity of pressure reduction, the time of exposure, physiological and health conditions of the person, chemical infiltration into the body (and blood) and physical forces such as shock and g-loading.

Carbon monoxide (CO), for example, is a gas that exacerbates the onset of hypoxic hypoxia and generates a condition known as hypemic hypoxia. The CO interferes with the ability of the blood to carry oxygen by preventing it from attaching to the hemoglobin with the red blood cells. Also, as the ambient pressure is reduced (increasing cabin altitude), gases or other chemicals may become more toxic in and of themselves, thereby lowering the permissible exposure limit (or allowable concentration) of those commodities. These chemicals are typically those that interfere with the cell's ability to utilize the oxygen. Alcohol, narcotics and cyanide are cited examples of chemicals that would readily contribute to histotoxic hypoxia.

The natural extension of the cabin pressure monitor is to monitor the presence of those gases and chemicals one might find in the environment of use and adjust the rules (threshold limits) to account for changes in pressure, temperature and humidity. Likewise, the detected pressure (or altitude) limits established to prevent hypoxia might be lowered according to the concentration of the detected gases and chemicals.

In the aviation environment, the detection of carbon monoxide is a critical gas measurement along with ambient pressure and relative humidity to adjust sensor response and threshold levels. In space applications, such as on the space shuttle or space station, the monitoring of carbon dioxide ($CO_2$) is important because the breathing air is recirculated and the accumulation of exhaled $CO_2$ needs to be scrubbed out of the environment. Also, ammonia and hypergolic fluids are used extensively on these space vehicles, and it is critical that there be proper and timely detection of any contamination in the airlock or of the astronauts' space suits resulting from a space walk or extravehicular activity (EVA).

A number of optional gas sensors 52 may also be included in the monitor 10 to provide additional detection and warning capabilities. Integrating additional sensors into the monitor 10 allows for greater utility of the unit as a personal environment monitor. Since the monitor 10 is microprocessor based with analog and digital input capability, sensor interface, calibration, scaling and set-point alarms are readily achievable. Examples of additional sensors that can be included in the monitor 10 include an oxygen ($O_2$) sensor, which makes the monitor 10 useful for confined space operations or where oxygen concentration levels falls below the critical life-sustaining value of 17–19%. A carbon monoxide (CO) sensor is useful for surface vehicle (road or marine), or aircraft where there is a potential of this odorless, poisonous by-product of combustion incapacitating the crew and/or passengers when the concentration exceeds a pre-programmed value of say 50 to 700 ppm. This would also be useful for personnel working in garages, fired boiler/heat plants and the like. A carbon dioxide ($CO_2$) sensor affords utility in closed human tended environments such as space vehicles, submarines, simulation chambers, etc. for monitoring the quality of the breathing air and hence performance of lithium hydroxide or other forms of $CO_2$ scrubbers. Sensors to detect ammonia or fluorocarbons (refrigerants), hydrocarbon and hypergolic fuels, oxidizers, etc. could be also be added for personnel who work in aerospace or industrial environments where these commodities are readily used.

The optional sensors 52 are preferably interfaced to, or incorporated in, the circuitry of the monitor 10. Power to the sensors 52 would be provided by the monitors battery power supply 42, and can range from low voltage, low current bridge excitation voltage to primary input power to feed the sensor electronics or heater elements. As illustrated in FIG. 2, the output signals from the sensors 52 can be interfaced to the microprocessor 30 either via the A/D converter 36 or through the microprocessor's serial or parallel ports. Calibration and scaling coefficients, along with conversion, display and alarm algorithms would reside in the non-volatile memory associated with the microprocessor 30.

The operation of the monitor 10 will now be described. First, upon detection of a cabin pressure altitude that exceeds either 10,000 or 12,500 feet, depending on whether the commercial or civil aviation mode is selected, the microprocessor 30 generates a first, early warning signal that indicates that the cabin pressure altitude has achieved the first threshold warning level. At this point, an internal clock in the microprocessor 30 begins counting the time period during which the first threshold level is exceeded. If the time period exceeds a preset time, preferably 30 minutes, a second alarm signal is generated. It should be noted that the time period is a cumulative measurement that may not all be accumulated in a single occurrence of the first pressure altitude level being exceeded. For example, if the pressure altitude is detected to drop below the first threshold level, the current time period is halted, and stored in the memory 31. If a cabin pressure altitude above the first threshold is once again detected then the time clock resumes counting from the point at which it last stopped. An alarm signal will also be generated any time that the detected pressure altitude exceeds a second, higher level of 12,000 feet for commercial aircraft, and 14,000 feet for civil aircraft. Once this occurs, an alarm will be generated until the pressure altitude drops below the first threshold level. It should be noted that the 30 minute interval clock will continue to run and will reset only on shutting off the unit.

Since the monitor 10 is a safety device for environmental condition monitoring and warning, there is no ALARM DISABLE button to permanently defeat its purpose. If a cabin pressure altitude is sensed that is above the trigger point of 12,500 (10,000 for commercial aircraft operations) feet, the audio alarm 48 will sound and the vibrating unit 50 will activate until the condition is corrected or until the TEMPORARY ALARM RESET button is pushed. This action will silence the audio alarm 48 and vibrator 50. Once a 12,500 (10,000) feet or higher cabin pressure altitude situation has been detected for 30 minutes or more, or anytime a 14,000 (12,000) feet or higher cabin pressure has been detected, the vibrator 50 will activate immediately, the LED 16 will flash, and a pulsating audio alarm will be sounded by the audio alarm 48. This is the warning to immediately initiate the use of supplemental oxygen. The audio alarm 48 can be manually silenced by pressing the TEMPORARY ALARM RESET button, but will only do so for a 5-minute period where upon it will once again trigger. This alarming action will continue until the cabin pressure altitude returns to below 12,500 (10,000) feet.

As mentioned previously, the monitor 10 can also be used to display the ambient pressure reading in user selectable units (i.e. mb, in. of Hg, or PSI). This would allow it to serve as a supplemental or emergency pressure altimeter or pressure monitor for use in small, non-pressurized aircraft, gliders, balloon, etc. With the microprocessor 30 keeping track of the time rate of change of altitude, the monitor 10 can also be used as a supplemental rate-of-climb or descent indicator for these applications.

In summary, the ultimate application of the monitor 10 is to prevent the loss of life, mission, or hardware by detecting and alerting the user to a degraded or degrading ambient pressure situation so that corrective and protective action can be taken in a timely and efficient manner. The main advantage of the invention is that it is portable and operates independently of all other systems. It also provides audio, physical and visual warnings relative to the FAA guidelines on the use of supplemental oxygen for flight crewmembers. Being a stand-alone, pressure monitoring device with an integrated timer, the invention can also serve as an unattended, yet vigilant monitor to remind pilots when they have exceeded the FAA limit of 30 minutes at a cabin pressure altitude between 12,500–14,000 feet for non-commercial operations or 10,000–12,000 feet for commercial or air-carrier operations.

The invention thus has primary application in the aviation industry. Specifically, crewmembers of both pressurized and non-pressurized aircraft would benefit from this personally carried, independent, safety device. In pressurized aircraft, the device can serve to independently monitor cabin pressure to guard against incipient pressurization losses. In non-pressurized aircraft, the device can warn pilots when the allowable time-at-altitude (without supplemental oxygen) has been exceeded. Possible secondary aviation applications are for use as a supplemental or emergency pressure altimeter for pilots of small aircraft, balloons, gliders, etc.

In addition, the invention can also be used for personal working in pressure vessels capable of abruptly, but unknowingly changing ambient pressures, such as environmental chamber, space (e.g., Mars) simulation chambers and hyperbaric chambers. There is also possible application for space flight use such as on Shuttle, the International Space Station or on long-duration, human-tended space vehicles and habitats, where the loss of cabin or environmental pressurization could be catastrophic.

Although the invention has been disclosed in terms of a preferred embodiment, and variations thereon, it will be understood that numerous additional variations and modifications could be made thereto without departing from the scope of the invention as set forth in the following claims.

What is claimed is:

1. A method of monitoring and alerting a user to an ambient condition based on equivalent pressure altitude level comprising:
    selecting a first predetermined equivalent pressure altitude level;
    selecting a first predetermined period of time;
    measuring the equivalent pressure altitude level;
    comparing the first predetermined equivalent pressure altitude level with the measured equivalent pressure altitude level;
    measuring a period of time when the measured equivalent pressure altitude level is greater than the first predetermined equivalent pressure altitude level; and
    alerting the user with a time period signal when the measured period of time is greater than the predetermined period of time.

2. The method of claim 1, wherein measuring the equivalent pressure altitude level is based on the local air pressure in a cockpit or cabin.

3. The method of claim 1, wherein measuring the period of time comprises: measuring cumulative measured periods of time, each measured period of time ending when the measured equivalent pressure altitude level is less than the first predetermined equivalent pressure altitude level.

4. The method of claim 1, further comprising:
    selecting a second predetermined equivalent pressure altitude level;
    alerting the user with an equivalent pressure altitude signal when the measured equivalent pressure altitude level is greater than the second predetermined equivalent pressure altitude level.

5. The method of claim 4, wherein measuring the equivalent pressure altitude level is based on the local air pressure in a cockpit or cabin.

6. The method of claim 4, wherein the first and second predetermined equivalent pressure altitude levels are 10,000 feet and 12,000 feet respectively based on local air pressure and the predetermined period of time is 30 minutes.

7. The method of claim 4, wherein the first and second predetermined equivalent pressure altitude levels are 12,500 feet and 14,000 feet respectively based on local air pressure and the predetermined period of time is 30 minutes.

8. The method of claim 1, further comprising:
    selecting a predetermined concentration level of a gas at a predetermined equivalent pressure altitude level, the predetermined concentration level of a gas being based on user safety information;
    measuring a concentration level of a selected gas; and
    alerting the user with a gas concentration signal when the measured concentration level of the selected gas is greater than the predetermined concentration level of the gas at the predetermined equivalent pressure altitude level.

9. A method of monitoring and alerting a user to an ambient condition based on equivalent pressure altitude level comprising:
    selecting a first predetermined equivalent pressure altitude level;
    selecting a second predetermined equivalent pressure altitude level, the second predetermined equivalent pressure altitude level being greater than the first predetermined pressure altitude level;
    measuring the equivalent pressure altitude level;
    comparing the first predetermined equivalent pressure altitude level with the measured equivalent pressure altitude level;
    alerting the user with a first signal when the measured equivalent pressure altitude level is greater than the first predetermined equivalent pressure altitude;
    comparing the second predetermined equivalent pressure altitude level with the measured equivalent pressure altitude level; and alerting the user with a second signal when the measured equivalent pressure altitude level is greater than the second predetermined equivalent pressure altitude.

10. The method of claim 9, wherein measuring the equivalent pressure altitude level is based on the local air pressure in a cockpit or cabin.

11. The method of claim 9, further comprising:

selecting a first predetermined period of time;

measuring a period of time when the measured equivalent pressure altitude level is greater than the first predetermined equivalent pressure altitude level; and alerting the user with a time period signal when the measured period of time is greater than the predetermined period of time.

12. The method of claim 1, wherein measuring the period of time comprises: measuring cumulative measured periods of time, each measured period of time beginning when the measured equivalent pressure altitude level is greater than the first predetermined equivalent pressure altitude level and each measured period of time ending when the measured equivalent pressure altitude level is less than the first predetermined equivalent pressure altitude level.

13. The method of claim 9, further comprising:

selecting a predetermined concentration level of a gas at a predetermined equivalent pressure altitude level, the predetermined concentration level of a gas being based on user safety information;

measuring a concentration level of a selected gas; and alerting the user with a gas concentration signal when the measured concentration level of the selected gas is greater than the predetermined concentration level of the gas at the predetermined equivalent pressure altitude level.

14. A method of monitoring and alerting a user to an ambient condition based on equivalent pressure depth level for high pressure or undersea operations comprising:

selecting a first predetermined equivalent pressure depth level;

selecting a first predetermined period of time;

measuring the equivalent pressure depth level;

comparing the first predetermined equivalent pressure depth level with the measured equivalent pressure depth level;

measuring a period of time when the measured equivalent pressure depth level is greater than the first predetermined equivalent pressure depth level; and alerting the user with a time period signal when the measured period of time is greater than the predetermined period of time.

15. The method of claim 14, wherein measuring the period of time comprises: measuring cumulative measured periods of time, each measured period of time ending when the measured equivalent pressure depth level is less than the first predetermined equivalent pressure depth level.

16. The method of claim 14, further comprising:

selecting a second predetermined equivalent pressure depth level;

alerting the user with an equivalent pressure depth signal when the measured equivalent pressure depth level is greater than the second predetermined equivalent pressure depth level.

17. The method of claim 14, further comprising:

selecting a predetermined concentration level of a gas at a predetermined equivalent pressure depth level, the predetermined concentration level of a gas being based on user safety information;

measuring a concentration level of a selected gas; and alerting the user with a gas concentration signal when the measured concentration level of the selected gas is greater than the predetermined concentration level of the gas at the predetermined equivalent pressure depth level.

* * * * *